United States Patent
O'Konski et al.

(10) Patent No.: US 10,290,314 B1
(45) Date of Patent: May 14, 2019

(54) LOCATING ELECTRICAL CONTACT PADS ON A SLIDER BODY, AND RELATED ROW BARS THAT INCLUDE SUCH SLIDER BODIES

(71) Applicant: Seagate Technology LLC, Cupertino, CA (US)

(72) Inventors: Jeff R. O'Konski, Savage, MN (US); Andrew David Habermas, Bloomington, MN (US); Andrew J. Sherve, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/002,581

(22) Filed: Jun. 7, 2018

Related U.S. Application Data

(63) Continuation-in-part of application No. 15/640,083, filed on Jun. 30, 2017, now abandoned.

(51) Int. Cl.
  *G11B 5/31* (2006.01)
  *G11B 5/48* (2006.01)
  *G11B 5/39* (2006.01)
  *G11B 5/60* (2006.01)

(52) U.S. Cl.
  CPC .......... *G11B 5/3169* (2013.01); *G11B 5/3173* (2013.01); *G11B 5/3967* (2013.01); *G11B 5/4853* (2013.01); *G11B 5/6082* (2013.01)

(58) Field of Classification Search
  None
  See application file for complete search history.

(56) References Cited

U.S. PATENT DOCUMENTS

| | | | |
|---|---|---|---|
| 6,046,596 A * | 4/2000 | Schaenzer et al. | G11B 5/6005 360/6 |
| 6,884,148 B1 | 4/2005 | Dovek et al. | |
| 7,551,406 B1 | 6/2009 | Thomas et al. | |
| 7,643,250 B2 | 1/2010 | Araki et al. | |
| 8,165,709 B1 | 4/2012 | Rudy | |
| 8,254,057 B1 * | 8/2012 | Hattori et al. | G11B 5/3169 360/110 |
| 8,254,087 B2 | 8/2012 | Ibata et al. | |
| 8,427,925 B2 | 4/2013 | Zhao et al. | |
| 9,721,595 B1 | 8/2017 | Rudy et al. | |
| 2005/0047016 A1 * | 3/2005 | Koide et al. | G11B 5/4826 360/234.5 |
| 2006/0028770 A1 | 2/2006 | Etoh et al. | |
| 2006/0168798 A1 | 8/2006 | Naka | |
| 2008/0022510 A1 | 1/2008 | Tanaka | |
| 2008/0072418 A1 | 3/2008 | Kondo et al. | |

(Continued)

*Primary Examiner* — Craig A. Renner
(74) *Attorney, Agent, or Firm* — Kagan Binder, PLLC

(57) ABSTRACT

The present disclosure involves a row bar that includes a plurality of slider bodies to be lapped. At least one slider body includes at least a first row of a plurality of electrical contact pads; and a second row of a plurality of electrical contact pads. The first row of electrical contact pads extends along the cross-track direction at a first position in a lapping direction. The second row of electrical contact pads extends along the cross-track direction at a second position in the lapping direction. The second row of electrical contact pads are electrically isolated from ground. The present disclosure also involves related methods of locating electrical contact pads on a slider body.

8 Claims, 5 Drawing Sheets

(56) References Cited

U.S. PATENT DOCUMENTS

| | | | |
|---|---|---|---|
| 2009/0086374 A1* | 4/2009 | Smith | G11B 5/4853 360/234.5 |
| 2010/0208391 A1 | 8/2010 | Gokemeijer | |
| 2011/0194208 A1* | 8/2011 | Chou et al. | G11B 5/4853 360/234.3 |
| 2012/0036706 A1* | 2/2012 | Lau et al. | G11B 5/3169 29/603.01 |

* cited by examiner

LOCATING ELECTRICAL CONTACT PADS ON A SLIDER BODY, AND RELATED ROW BARS THAT INCLUDE SUCH SLIDER BODIES

RELATED APPLICATION

The present Application is a continuation-in-part of U.S. patent application Ser. No. 15/640,083 filed on Jun. 30, 2017, and entitled "LOCATING ELECTRONIC LAPPING GUIDES ON A SLIDER BODY, AND RELATED ROW BARS THAT INCLUDE SLIDER BODIES," which application is incorporated herein by reference in its entirety.

BACKGROUND

The present disclosure relates to locating electronic lapping guides (ELGs) on one or more slider bodies in a row bar that includes a plurality of slider bodies to be lapped. The bulk of slider bodies can be made out of ceramic material such as a two phase mixture of alumina and titanium-carbide (also referred to as AlTiC).

SUMMARY

Embodiments of the present disclosure include a row bar including a plurality of slider bodies, wherein at least one slider body includes:

a) an air bearing surface side defining a lapping plane, wherein the air bearing surface side has a leading edge and a trailing edge, wherein the direction along the trailing edge is defined as the cross-track axis and the direction from the leading edge to the trailing edge and perpendicular to the cross-track axis is defined as the down-track axis;

b) a first row of a plurality of electrical contact pads; and c) a second row of a plurality of electrical contact pads, wherein the first row of electrical contact pads extends along the cross-track direction at a first position in a lapping direction, wherein the second row of electrical contact pads extends along the cross-track direction at a second position in the lapping direction, wherein the second row of electrical contact pads are electrically isolated from ground.

Embodiments of the present disclosure also include a row bar including a plurality of slider bodies, wherein at least one slider body includes:

a) an air bearing surface side defining a lapping plane, wherein the air bearing surface side has a leading edge and a trailing edge, wherein the direction along the trailing edge is defined as the cross-track axis and the direction from the leading edge to the trailing edge and perpendicular to the cross-track axis is defined as the down-track axis;

b) at least one magnetic reader located adjacent to the lapping plane;

c) at least one magnetic writer located adjacent to the lapping plane;

d) at least a first electronic lapping guide located adjacent to the lapping plane, wherein the first electronic lapping guide is associated with the magnetic reader; and e) at least a second electronic lapping guide located adjacent to the lapping plane, wherein the second electronic lapping guide is associated with the magnetic writer; and f) at least a first electrical contact pad, a second electrical contact pad, and a third electrical contact pad, wherein the first electronic lapping guide is electrically coupled to the first and third electrical contact pads, wherein the second electronic lapping guide is electrically coupled to the second and third electrical contact pads, and wherein the first, second, and third electrical contact pads are electrically isolated from ground.

Embodiments of the present disclosure also include a method of locating electrical contact pads on a row bar including:

a) providing row bar including a plurality of slider bodies, wherein each slider body includes an air bearing surface side defining a lapping plane, wherein the air bearing surface side has a leading edge and a trailing edge, wherein the direction along the trailing edge is defined as the cross-track axis and the direction from the leading edge to the trailing edge and perpendicular to the cross-track axis is defined as the down-track axis;

b) providing at least a first row of a plurality of electrical contact pads on each slider body; and a second row of a plurality of electrical contact pads on each slider body, wherein the first row of electrical contact pads extends along the cross-track direction at a first position in a lapping direction, wherein the second row of electrical contact pads extends along the cross-track direction at a second position in the lapping direction, wherein the second row of electrical contact pads are electrically isolated from ground.

DETAILED DESCRIPTION

Figure 1:
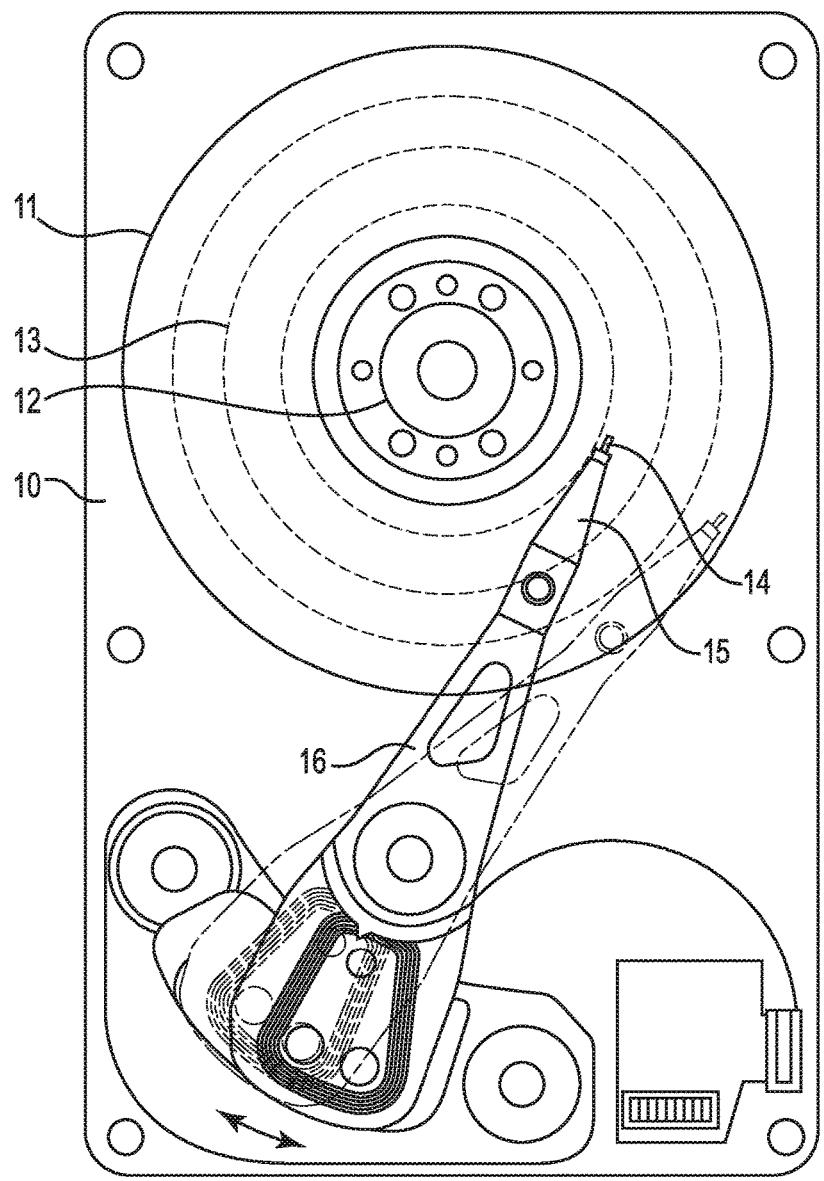
FIG. 1 shows a top view of a hard disc drive with the cover removed.

A magnetic recording apparatus is shown in FIG. 1. The apparatus 10 can be referred to as a hard disk drive (HDD) and includes a slider 14 that flies above a disk 11 by using air as a lubricant. Referring to FIG. 1, a disk 11 is placed on a spindle motor 12 that can rotate and a negative pressure air-lubricated bearing slider 14 is attached at a suspension 15 to correspond to the magnetic disk 11. The negative pressure air-lubricated bearing slider 14 can be moved (as indicated by the arrow and dashed lines) by an actuator 16 which pivots so that the slider 14 moves to a desired position on a track 13 of the disk 11. As shown, the disk 11 used as a recording medium has a circular shape and different information can be recorded on each track 13. In general, to obtain desired information, the slider 14 moves in search of a corresponding track on the disk 11. Disk 11 can have a magnetic layer that is susceptible to physical and/or chemical damage. To help mitigate such damage, such a disc often has a coating such as Diamond-like Carbon (DLC) as an overcoat to help protect the magnetic layer from physically and/or chemically induced damage.

Figure 2:
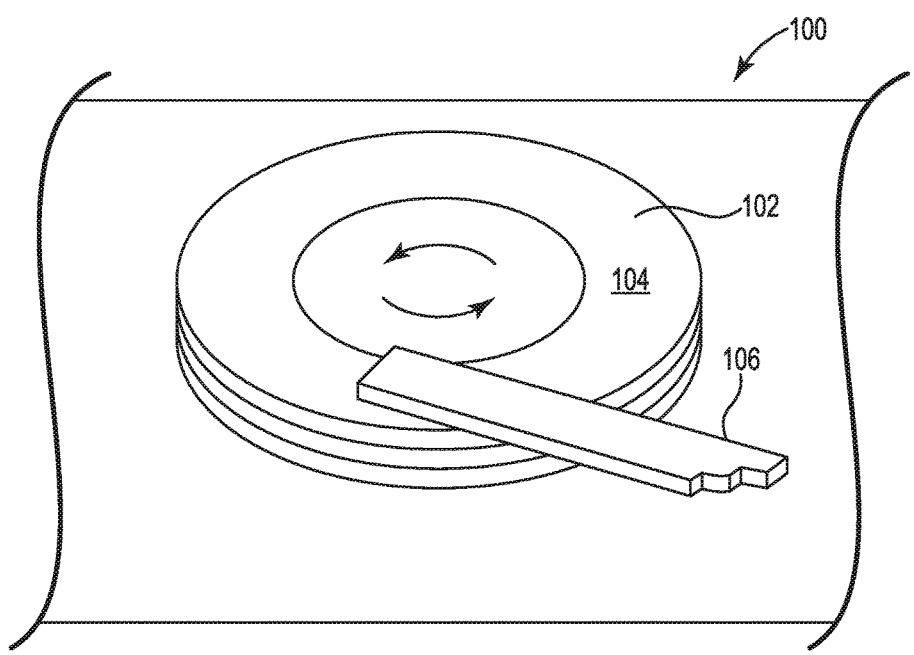
FIG. 2 is a schematic perspective view showing a lapping plate in a portion of a lapping tool.

FIG. 2 diagrammatically depicts a lapping tool 100 used for machining a surface of a row bar that can be later sliced into a plurality of individual sliders such as slider 14. The tool 100 has a rotating lapping plate 102 defining a lapping surface 104 which can help abrade the surface of a ceramic material such as AlTiC. If desired, a slurry can be applied to the lapping surface 104 to enhance the abrading action as the lapping surface 104 is rotated relative to a row bar 106 containing a plurality of the sliders held in a pressing engagement against the lapping surface 104. Lapping a row bar of sliders permits multiple slider bodies to be processed together, which can advantageously be relatively simple, precise and/or cost-effective. Lapping can involve multiple lapping steps such as rough lapping, final (kiss) lapping, and the like. At a desired point in manufacturing, individual sliders can be sliced from the row bar and ultimately used in a hard disk drive.

In some embodiments, a row bar can include a plurality of slider bodies. In some embodiments, a row bar can include at least 30 slider bodies, at least 60 slider bodies, or even at least 70 slider bodies.

Figure 3:
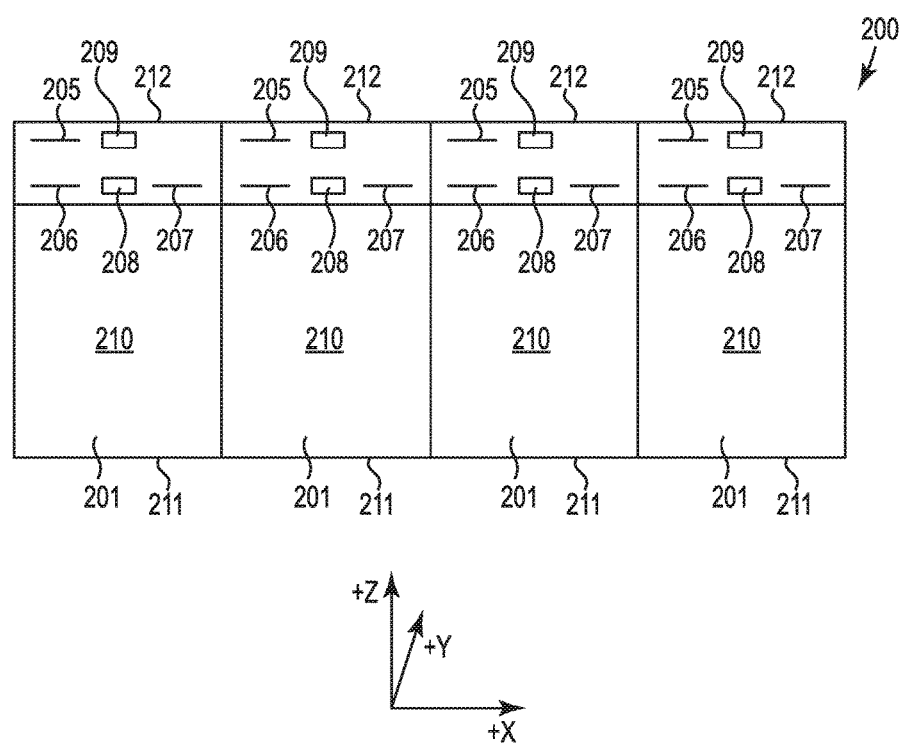
FIG. 3 is a schematic, partial, bottom view of a row bar of sliders illustrating an embodiment of the present disclosure.

FIG. 3 depicts an embodiment of a row bar 200 according to the present disclosure. As shown, a portion of row bar 200 is illustrated, which includes a plurality of slider bodies 201 (four slider bodies are shown). As shown, each slider body 201 includes an air bearing surface side 210 defining a lapping plane, which can contact a lapping plate during lapping so that material can be removed from the air bearing surface side 210. As shown, the air bearing surface side 210 has a leading edge 211 and a trailing edge 212. As used herein, the direction along the trailing edge 212 is defined as the cross-track axis, which is illustrated in FIG. 3 as the "+x" axis.

Also as used herein, the direction from the leading edge 211 to the trailing edge 212 and perpendicular to the cross-track ("x") axis is defined as the down-track axis, which is illustrated in FIG. 3 as the "+z" axis. As used herein, the "+y" axis can be referred to as the lapping direction axis as that is the direction that material is removed from row bar 200 during lapping. Each slider body 201 also includes at least one magnetic reader 208 and at least one magnetic writer 209. Magnetic readers can be formed in a layer separate from or together with other slider elements. Magnetic readers can read data stored in a magnetic media hard disk. Magnetic writers can be formed in a layer separate from or together with other slider elements. Magnetic writers can write data to a magnetic media hard disk for storage. A slider body can include one or more additional elements/devices such as a near-field transducer (not shown). An NFT can be used in heat assisted magnetic recording (HAMR). HAMR generally refers to the concept of locally heating a recording medium to reduce the coercivity of the recording medium so that the applied magnetic writing field can more easily direct the magnetization of the recording medium during the temporary magnetic softening of the recording medium caused by the heat source. An NFT can be used to concentrate light onto a small spot on the recording medium to heat the recording medium. An example of an NFT is described in U.S. Pat. No. 8,427,925 (Zhao et al.), wherein the entirety of said patent document is incorporated herein by reference for all purposes.

As shown in FIG. 3, each slider body 201 also includes at least three ELGs 205, 206, and 207. An ELG has an electrical resistance that can change as conditions change. For example, the electrical resistance of an ELG can increase as ELG material is removed during a lapping process and thus may be used to monitor lapping of the air bearing surface side 210 during slider manufacturing. Accordingly, an ELG may be formed on a surface of the slider body and the ELG resistance may be monitored during lapping. The resistance of an ELG can be correlated to material removed from an element that the ELG is associated with such as a magnetic reader, magnetic writer, and/or a near-field transducer. Thus, the ELG can be used to target a desired dimension of the magnetic reader, writer, or near-field transducer. For example, an ELG can be used during lapping to target a height value for a magnetic reader (e.g. "stripe height") and another ELG can be used during lapping to target a height value for a magnetic writer (e.g., "break point"). ELGs are also described in U.S. Pat. No. 7,643,250 (Araki et al.), U.S. Pat. No. 8,165,709 (Rudy), 2006/0168798 (Naka), and 2010/0208391 (Gokemeijer), wherein there entireties of said patent documents are incorporated herein by reference for all purposes.

ELGs and methods of making ELGs are known. An ELG can be formed via one or more lithography techniques. For example, an ELG can be formed on a slider body using the same materials and at the same time as a corresponding element that it is associated with (e.g., a writer, a reader, or an NFT). Forming an ELG at the same time as the element that it is associated with permits any variation in forming the ELG to be translated to the corresponding element. As shown in FIG. 3, first electronic lapping guide 206 is located adjacent to the lapping plane and is associated with the magnetic reader. The lapping plane corresponds to air bearing surface side 210. Second electronic lapping guide 205 is located adjacent to the lapping plane and is associated with the magnetic writer. ELG 205 and ELG 206 are both adjacent to the same lapping plane so ELG 205 and ELG 206 are also both present in the same layer of slider body 201. First ELG 206 has a center of mass located at a first position along the cross-track axis and second ELG 205 has a center of mass located at a second position along the cross-track axis. According to the present disclosure, the difference between the first position and second position is 10 micrometers or less, 1000 nanometers or less, 100 nanometers or less, 50 nanometers or less, 20 nanometers or less, or even 10 nanometers or less. In some embodiments, the difference between the first position and second position can be from 10 nanometers to 10 micrometers, from 10 nanometers to 100 nanometers, or even from 10 to 20 nanometers.

As shown in FIG. 3, first ELG 206 and second ELG 205 are offset from each in the down-track axis ("+z"). The first ELG 206 has a center of mass located at a first position along the down-track axis and second ELG 205 has a center of mass located at a second position along the down-track axis. In some embodiments, the difference between the first position and second position along the down-track axis is 0.5 to 20 micrometers, or even 1 to 10 micrometers (e.g., 4 to 6 micrometers).

Figure 4:
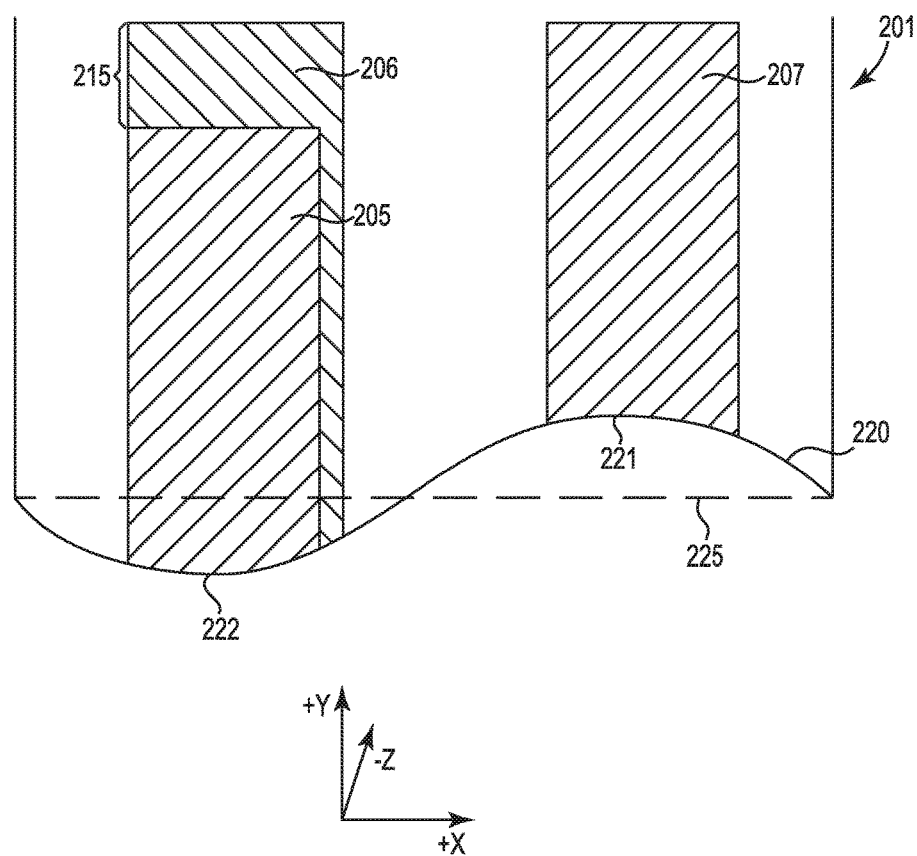
FIG. 4 is a schematic, partial, cross-sectional view of a slider body in FIG. 3.

Locating ELG 205 and ELG 206 along the cross-track axis (+x), as described above, can be referred to as "co-locating" ELG 205 and ELG 206. FIG. 4 is a schematic, partial, cross-sectional view of a slider body in FIG. 3. The view in FIG. 4 has the +z axis coming out of the page and the −z axis going into the page. Thus, ELG 206 is spatial located behind ELG 205. Both ELG 205 and ELG 206 extend to position 222 of surface 220. As shown in FIG. 4, co-locating ELG 205 and ELG 206 along the cross-track axis permits the difference in height 215 among ELG 205 and ELG 206 along the +y axis to be determined in a relatively more accurate manner. The target difference in height 215 can be zero or some non-zero target. With respect to co-locating ELG 205 and ELG 206, FIG. 4 shows that first ELG 206 has a center of mass located at a first position along the cross-track axis and second ELG 205 has a center of mass located at a second position along the cross-track axis, where the first and second positions along the cross-track positions are the same. By co-locating ELG 205 and ELG 206 in this or a similar manner, interpolation errors that might otherwise result can be reduced or eliminated. For example, air bearing surface side 210 is often assumed to be flat as illustrated by dotted line 225. But, oftentimes air bearing surface side 210 has a non-uniform surface 220 with areas 221 and 222 that deviate from the assumed flat profile 225. If reader ELG 206 was positioned where reader ELG 207 is positioned then the difference in height 215 would not account for the positions 221 and 222 that are above and below, respectively, the assumed flat profile 225, thereby introducing error that may not be accounted for. But, by co-locating at least reader ELG 206 and writer ELG 205, their center of mass position relative to each other along the cross-track axis can be such as to help reduce or eliminate any such cross-track error. That is, since their center of mass position along the cross-track axis is substantially the same any error that may be present due not non-uniformity of surface 220 in the cross-track direction can be reduced or eliminated, thereby permitting the difference in height 215 to be determined more accurately. In some embodiments, the target different in height 215 can be controlled to within 10 nanometers or less, 5 nanometers or less, or even 1 nanometer or less. It is estimated that nanometers of error can be saved by co-locating reader ELG 206 and writer ELG 205, which may have their center of masses positioned hundreds of microns away from each other along the cross-track axis, e.g., in an adjacent slider bodies. Eliminating such error as described herein above can help improve accuracy during lapping, especially during rough lapping. The presence of two co-located ELGs could be used for improved calculation of best reader-to-writer tilt at the cross-track position of the device.

In some embodiments, the magnetic reader associated with first ELG 206 and the magnetic writer associated with second electronic lapping guide 205 can be associated with a second pair of co-located ELGs located on a different side of the magnetic reader and writer.

Thin film deposition techniques can be used to fabricate slider body elements as described herein such as ELGs (including co-located ELGs), magnetic readers, magnetic writers, and the like. For example, an array of transducers and ELGs can be formed on a common substrate (e.g., a wafer) by a deposition of metallic and nonmetallic layers. The patterning of the array of transducers and ELGs can be accomplished using photolithography in combination with etching and lift-off processes. The finished array or wafer can be optically and electrically inspected and then sliced to produce bars, with one row of transducers in a side-by-side pattern on each bar. The bars can then lapped at the air bearing surface (ABS), which will eventually face the recording medium, to establish a specified sensor height.

In some embodiments, a slider body can include one or more additional ELGs. For example, as shown in FIGS. 3 and 4, slider bodies 201 include a third electronic lapping guide 207 located adjacent to the lapping plane. The third electronic lapping guide 207 is associated with a magnetic reader (not shown) and has a center of mass located at a third position along the cross-track axis. The difference between the first position (discussed above) and third position is 10 micrometers or more, or even 50 micrometers or more. Additional ELGs could also be associated with one or more NFTs.

In order to electronically access slider elements (e.g., magnetic writer 209; magnetic reader 208; ELGs 505, 506, and 507; heaters, etc.), a slider body 501 can include a plurality of contact pads that may be electrically connected to the elements. Some of the contact pads and slider elements may be used during operation of the hard disk drive, e.g., the contact pads for the magnetic writer, magnetic reader, and heater may be used to perform disk access operations. However, some of the contact pads and slider elements may only be used during manufacture of the slider (e.g., the contact pads for the one or more ELGs).

Figure 5:
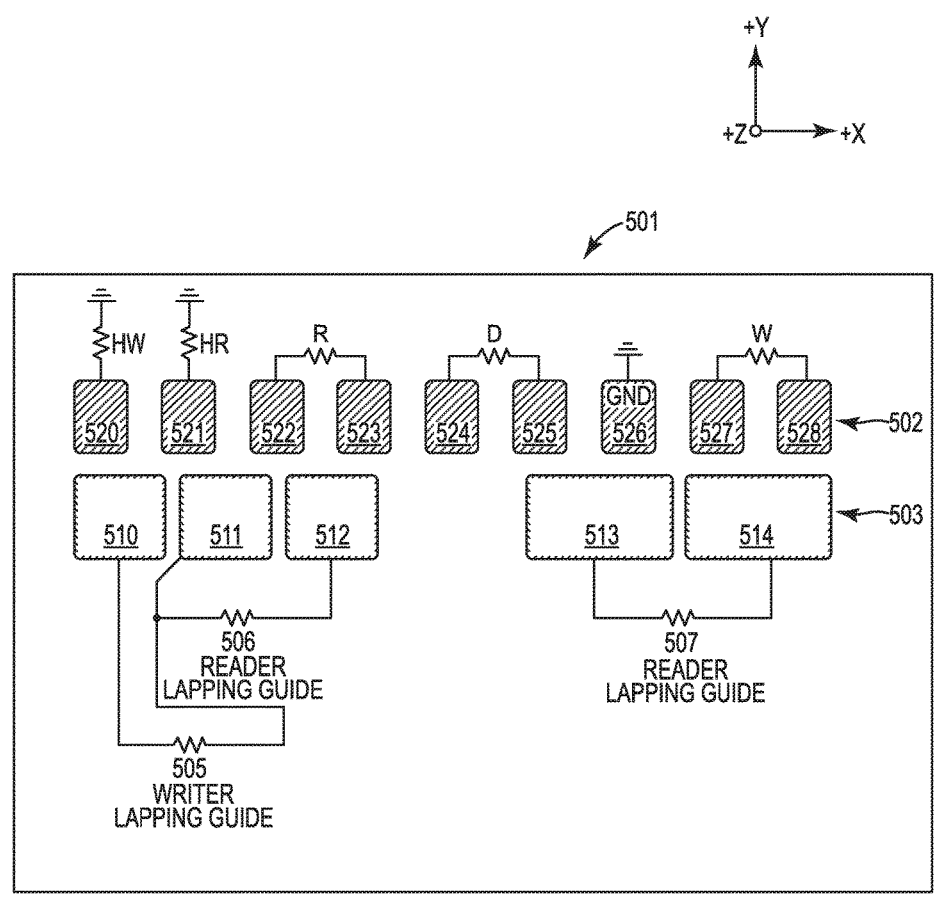
FIG. 5 is a schematic illustration showing electronic lapping guides electrically connected to contact pads.

FIG. 5 is a schematic that shows the trailing edge face of slider body 501. The contact pads illustrated are present on the trailing edge face. FIG. 5 also includes an electrical wiring diagram showing how the contact pads are electrically connected to devices such as reader, writer, heater, and the like. As shown in FIG. 5, slider body 501 includes a first row 502 of electrical contact pads along the cross track axis "x" and a second row 503 of electrical contact pads along the cross-track axis "x". The first row 502 of contact pads include a ground contact pad 526 and can be electrically connected to features used during head-gimbal assembly (HGA) operation in a hard disk drive (HDD). The second row 503 of electrical contact pads can be dedicated for use of features used during lapping according to the present disclosure. That way, electrical connections can be made to the second row 503 of electrical contact pads and then after lapping is done, the second row 503 of electrical contact pads can just be left unused, thereby leaving the first row 502 of electrical contact pads in relatively good condition. For example, the first row 502 of electrical contact pads can avoid having undue scratching, probe marks, or remnants of wire bonds from the lapping process, allowing for increased HGA wire connection yield.

In more detail, the second row 503 of electrical contact pads includes at least a first electrical contact pad 512, a second electrical contact pad 510, and a third electrical contact pad 511. The first electronic lapping guide 506 is associated with a magnetic reader (e.g. reader 208) and is electrically coupled to the first 512 and third 511 electrical contact pads. The second electronic lapping guide 505 is associated with a magnetic writer (e.g., writer 209) and is electrically coupled to the second 510 and third 511 electrical contact pads. As can be seen, co-located ELGs 505 and 506 share contact pad 511, which advantageously facilitates electrically connecting both ELGs 505 and 506 on every slider body 501 of a row bar instead of electrically connecting only one co-located ELG. Advantageously, more data can be obtained for every slider body in a row bar by using co-located ELGs and an appropriate number of contact pads to electrically connect both co-located ELGs. Also, sharing contact pad 511 can save space in the second row 503 of electrical contact pads.

In some embodiments, additional contact pads can be used. For example, four contact pads could be used to electrically connect co-located ELGs 505 and 506, instead of ELGs sharing a common contact pad such as 511. In some embodiments, two pads for the first ELG 206 could be located hundreds of microns to the left of the co-located ELGs and two pads for the second ELG 205 could be located hundreds of microns to the right of the co-located ELGs.

As also shown in FIG. 5, the second row 503 of electrical contact pads in slider body 501 further includes at least a third electronic lapping guide 507 located adjacent to the lapping plane. The third electronic lapping guide 507 is associated with a magnetic reader (shown in FIG. 3 as 208). The third electronic lapping guide 507 can electrically coupled to the fourth 513 and fifth 514 electrical contact pads if desired. In one embodiment, the third electronic lapping guide 507 can be used to quantify down-track lapping errors from lapping guide 506. In another embodiment, the third electronic lapping guide 507 could have different geometry from 506, allowing for analysis of width effects, length effects, or a different sensitivity of resistance per lapping distance. In another embodiment, electronic lapping guide 506 could be patterned to track a first reader device, while electronic lapping guide 507 could be sequentially patterned to track a second reader present in the same head (not shown).

As shown, all of the electrical contact pads 510, 511, 512, 513, and 514 are electrically isolated from ground. In some embodiments, all electrical contact pads in the second row are electrically isolated from ground. In some embodiments, all electrical contact pads used during lapping are electrically isolated from ground. By coupling electronic features used during lapping such as the lapping guides 505, 506, and 507 to contact pads isolated from ground (e.g., ground contact pad 526), noise generated due to coupling to the ground can be avoided, especially in the context of precision resistance measurements using electronic lapping guides. When the high potential side of an electronic lapping guide touches a metal lapping plate, a shorting path can result through the plate if the lapping guide is grounded to the AlTiC substrate. Connection to ground in a hard drive head means electrical connection to AlTiC substrate. AlTiC substrate has cross-sectional area several orders of magnitude larger at air bearing surface compared with the cross-sectional area of a lapping guide. Lapping plates are typically made of metal, often have floating charge potential, and have high frictional forces when bars interact with the plates. Electrical isolation of the lapping guides from the ground (or AlTiC surface) minimizes the opportunities for plate-related potential charging to impact the electrical lapping guide resistance measurements.

As shown in FIG. 5, the first row 502 of electrical contact pads can be used for other slider elements such as elements used during hard disk drive operation. Such elements include magnetic readers, magnetic writers, heaters, and the like. As shown in FIG. 5, contact pad 520 can be used for a writer heater; contact pad 521 can be used for a reader heater; contact pads 522 and 523 can be used for a magnetic reader, contact pads 524 and 525 can be used for a thermal sensor such as "DETCR"; contact pad 526 is a ground contact pad; and contact pads 527 and 528 can be used for a magnetic writer.

Electrical contact pads can be made out a variety of conductive materials such as gold and the like. ELGs can be electrically connected to contact pads via bonding, soldering, or other electrical connection. For example, gold wire can be used to electrically connect a contact pad to an ELG.

Contact pads 510, 511, 512, 513, and 514 can be electrically connected to ELGs so that the ELGs can be used during one or more lapping steps. After lapping, the electrical connections can be disconnected. The remaining contact pads 517 can be electrically connected to corresponding slider elements when desired. For example, contact pads 517 that are used during hard disk drive operation can be connected to elements after lapping is completed if desired.

What is claimed is:

1. A row bar comprising a plurality of slider bodies, wherein at least one slider body comprises:
   a) an air bearing surface side defining a lapping plane, wherein the air bearing surface side has a leading edge and a trailing edge, wherein the direction along the trailing edge is defined as the cross-track axis and the direction from the leading edge to the trailing edge and perpendicular to the cross-track axis is defined as the down-track axis;
   b) at least a first electronic lapping guide and a second electronic lapping guide;
   c) a first row of a plurality of electrical contact pads; and
   d) a second row of a plurality of electrical contact pads, wherein the first row of electrical contact pads extends along the cross-track direction at a first position in a lapping direction, wherein the second row of electrical contact pads extends along the cross-track direction at a second position in the lapping direction, wherein the second row of a plurality of electrical contact pads comprises at least a first electrical contact pad, a second electrical contact pad, and a third electrical contact pad, wherein the first electronic lapping guide is electrically coupled to the first and third electrical contact pads, wherein the second electronic lapping guide is electrically coupled to the second and third electrical contact pads, and wherein the first, second, and third electrical contact pads are electrically isolated from ground.

2. A row bar comprising a plurality of slider bodies, wherein at least one slider body comprises:
   a) an air bearing surface side defining a lapping plane, wherein the air bearing surface side has a leading edge and a trailing edge, wherein the direction along the trailing edge is defined as the cross-track axis and the direction from the leading edge to the trailing edge and perpendicular to the cross-track axis is defined as the down-track axis;
   b) at least one magnetic reader located adjacent to the lapping plane;
   c) at least one magnetic writer located adjacent to the lapping plane;
   d) at least a first electronic lapping guide located adjacent to the lapping plane, wherein the first electronic lapping guide is associated with the magnetic reader; and
   e) at least a second electronic lapping guide located adjacent to the lapping plane, wherein the second electronic lapping guide is associated with the magnetic writer; and
   f) at least a first electrical contact pad, a second electrical contact pad, and a third electrical contact pad, wherein the first electronic lapping guide is electrically coupled to the first and third electrical contact pads, wherein the second electronic lapping guide is electrically coupled to the second and third electrical contact pads, and wherein the first, second, and third electrical contact pads are electrically isolated from ground.

3. The row bar of claim 2, wherein the at least one slider body further comprises:
   a) a first row of a plurality of electrical contact pads; and
   b) a second row of a plurality of electrical contact pads, wherein the first row of electrical contact pads extends along the cross-track direction at a first position in a lapping direction, wherein the second row of electrical contact pads extends along the cross-track direction at a second position in the lapping direction, wherein at least the first electrical contact pad, the second electrical contact pad, and the third electrical contact pad are in the second row.

4. The row bar of claim 3, the at least one slider body further comprises at least a third electronic lapping guide located adjacent to the lapping plane, wherein the third electronic lapping guide is associated with a magnetic reader.

5. The row bar of claim 4, wherein the second row of the at least one slider body further comprises at least a fourth electrical contact pad and a fifth electrical contact pad, wherein the third electronic lapping guide is electrically coupled to the fourth and fifth electrical contact pads, and wherein the fourth and fifth electrical contact pads are electrically isolated from ground.

6. The row bar of claim 2, wherein the row bar comprises at least 60 slider bodies.

7. The row bar of claim 6, wherein each slider body comprises:
   a) an air bearing surface side defining a lapping plane, wherein the air bearing surface side has a leading edge and a trailing edge, wherein the direction along the trailing edge is defined as the cross-track axis and the direction from the leading edge to the trailing edge and perpendicular to the cross-track axis is defined as the down-track axis;
   b) at least one magnetic reader located adjacent to the lapping plane;
   c) at least one magnetic writer located adjacent to the lapping plane;
   d) at least a first electronic lapping guide located adjacent to the lapping plane, wherein the first electronic lapping guide is associated with the magnetic reader; and
   e) at least a second electronic lapping guide located adjacent to the lapping plane, wherein the second electronic lapping guide is associated with the magnetic writer; and
   f) at least a first electrical contact pad, a second electrical contact pad, and a third electrical contact pad, wherein the first electronic lapping guide is electrically coupled to the first and third electrical contact pads, wherein the second electronic lapping guide is electrically coupled to the second and third electrical contact pads, and wherein the first, second, and third electrical contact pads are electrically isolated from ground.

8. A method of locating electrical contact pads on a row bar comprising:
   a) providing the row bar comprising a plurality of slider bodies, wherein each slider body comprises an air bearing surface side defining a lapping plane, wherein the air bearing surface side has a leading edge and a trailing edge, wherein the direction along the trailing edge is defined as the cross-track axis and the direction from the leading edge to the trailing edge and perpendicular to the cross-track axis is defined as the down-track axis;
   b) providing at least a first row of a plurality of electrical contact pads on each slider body; and a second row of a plurality of electrical contact pads on each slider body, wherein the first row of electrical contact pads extends along the cross-track direction at a first position in a lapping direction, wherein the second row of electrical contact pads extends along the cross-track direction at a second position in the lapping direction, wherein the second row of electrical contact pads comprises at least a first electrical contact pad, a second electrical contact pad, and a third electrical contact pad, wherein a first electronic lapping guide is electrically coupled to the first and third electrical contact pads, wherein a second electronic lapping guide is electrically coupled to the second and third electrical contact pads, and wherein the first, second, and third electrical contact pads are electrically isolated from ground.

\* \* \* \* \*